United States Patent
Laning et al.

(10) Patent No.: US 7,689,445 B2
(45) Date of Patent: Mar. 30, 2010

(54) SYSTEM AND METHOD FOR INSURING AGAINST TAX LIABILITIES

(76) Inventors: Kurt Laning, 21473 N. Prestwick Dr., Barrington, IL (US) 60010; Warren T. Wamberg, 7 Fox Hunt Rd., Barrington Hill, IL (US) 60010; Mark Hopfinger, 96 Nostra Villa Dr., Fenton, MO (US) 63026-3380; Jaime Correa, 16334 Peppermill Dr., Wildwood, MO (US) 63005

( * ) Notice: Subject to any disclaimer, the term of this patent is extended or adjusted under 35 U.S.C. 154(b) by 1378 days.

(21) Appl. No.: 10/960,687

(22) Filed: Oct. 8, 2004

(65) Prior Publication Data

US 2005/0137913 A1    Jun. 23, 2005

(51) Int. Cl.
*G06Q 99/00* (2006.01)
(52) U.S. Cl. .......................................................... 705/4
(58) Field of Classification Search .................... 705/4, 705/5–403
See application file for complete search history.

(56) References Cited

U.S. PATENT DOCUMENTS

| 6,430,542 B1 * | 8/2002 | Moran ...................... 705/36 R |
| 2004/0059609 A1 * | 3/2004 | Chatlain et al. ................. 705/4 |

* cited by examiner

*Primary Examiner*—Thu-Thao Havan
*Assistant Examiner*—Thomas M Hammond, III
(74) *Attorney, Agent, or Firm*—Dickstein Shapiro LLP

(57) ABSTRACT

A product, and preferably an insurance product, whereby the product benefits reimburse the purchaser for those risks associated with a potential change in the taxation of insurance policies. Another aspect is a method to determine a benefit amount and a policy price based upon future potential changes in the tax laws. A computer system which receives as its inputs policy data, owner data and insured data and uses that data to calculate benefits, price those benefits and provide as part of its output the price of the policy and a full description of those benefits.

4 Claims, 9 Drawing Sheets

Figure 3A Module 202
Calculation of Tax Recovery Product Benefit

In this example the TRP Product insures the tax expense associated with a Life Policy already owned by the purchaser. Tax on death benefits under current law is zero.

Owner Data (106)
Corporation Name      ABC Corp.
Corporate Tax Rate Federal      35%
Corporate Tax Rate State      5%

Insured Data (104)
Name      Jane Doe
Social Security Number      123-45-6789
Date of Birth      1/1/1945
Employment Status      Retired
Health Rating      Preferred

Policy Data (102)
Policy Benefit      1000
Cash Value      300
Modified Endowment Contract?      Yes
Tax Basis      300
Taxable Income      700    Due to tax law change
Tax Rate      15%    Example assumes a special tax rate applies
Tax      105    equals excess of tax that would have been due when PD purchased. after tax TRP benefit must equal this amount

External Data (108)
Status of tax law      1986 as amended
Interest rates available in market      5%
Current accounting rules      FAS 85-4

Figure 3B

Benefit Calculation (202)

| | | |
|---|---|---|
| Net After Tax value of TRP Product | 105 | From policy data 102 |
| TRP Tax Basis * | 15 | Premiums paid on policy - are assumed to be recoverable tax free |
| TRP Taxable Income | 90 | needing grossup |
| TRP Tax Rate | 40% | From Owner Data 106 |
| TRP Benefit | 165 | = (Tax(102) - TRP Tax Basis) / ( 1 - TRP Tax Rate) + TRP Tax Basis |

Verification of TRP Benefit Calculation

| | | |
|---|---|---|
| TRP Benefit | 165 | |
| TRP Tax Basis | 15 | |
| TRP Taxable Income | 150 | Benefit - Basis |
| TRP Tax Rate | 40% | |
| TRP Tax | 60 | Tax rate - taxable income |
| TRP Benefit after Tax | 105 | equals the tax due as a result of tax law change |

* This example assumes the premiums paid for the TRP policy are not deductible, and forms part of the tax basis of the TRP product. When benefits are paid by the TRP product, this portion of the benefit is excludable from taxable income.

Figure 4: Pricing Benefits Calculation Module (206)
One possible example of a pricing calculation for module 206

Premium Per Policy 100.00 per Policy Issued
Tax Basis

| | Information Source | | | | | | | | | | | | Step One: Demographics and underlying policy projections | | | | | Step 2: Generally accepted actuarial pricing methodology with input from Module 204 | | | | | | | TRP Per Policy Information | | To Output 208 |
|---|---|---|---|---|---|---|---|---|---|---|---|---|---|---|---|---|---|---|---|---|---|---|---|---|---|---|---|
| | 110 | 110 | 110 | 204 | 110 | 110 | 110 | 110 | 110 | 110 | | | | | | | | | | | | | | | | | 208 |
| Year | DB | Lives BOY | Lives EOY | Deaths | DB-Basis | DB-CV | DB-NAR | CV | CV / Policy Inforce | DB / Policy Inforce | CV Return | Law Not Changed | Law Changed | BaseTRP Rate | TRP Fee | TRP Rate | TRP Annual Cover | TRP Cumulative Cover | TRP Benefit | TRP Premium |
| 1 | 420 | 1,000.00 | 998.73 | 1.269 | 127 | 129 | 290 | 104,053 | 104,185 | 331,015 | 4.185% | 6.0% | 8.0% | 6.0% | 10.0% | 6.667% | 4.185 | 4.185 | 2.790 | 279.0 |
| 2 | 474 | 998.73 | 997.31 | 1,418 | 142 | 151 | 323 | 108,247 | 108,539 | 334,179 | 4.179% | 6.0% | 8.0% | 6.0% | 10.0% | 6.667% | 4.354 | 8.539 | 5.692 | 289.9 |
| 3 | 537 | 997.31 | 995.72 | 1,591 | 159 | 176 | 361 | 112,549 | 113,033 | 337,441 | 4.140% | 6.0% | 8.0% | 6.0% | 10.0% | 6.667% | 4.494 | 13,033 | 8.688 | 298.8 |
| 4 | 610 | 995.72 | 993.93 | 1,790 | 179 | 206 | 403 | 116,984 | 117,698 | 340,720 | 4.127% | 6.0% | 9.0% | 6.0% | 10.0% | 6.667% | 4.665 | 17,698 | 11.799 | 308.7 |
| 5 | 692 | 993.93 | 991.92 | 2.010 | 201 | 241 | 450 | 121,518 | 122,507 | 344,161 | 4.096% | 6.0% | 9.0% | 9.0% | 10.0% | 10.000% | 4.809 | 22,507 | 16.005 | 478.0 |
| 6 | 781 | 991.92 | 989.68 | 2.248 | 225 | 281 | 500 | 126,178 | 127,494 | 347,412 | 4.071% | 6.4% | 10.0% | 10.0% | 10.0% | 11.111% | 4.987 | 27,494 | 18,329 | 549.6 |
| 7 | 878 | 989.68 | 987.17 | 2,503 | 250 | 326 | 562 | 130,931 | 132,633 | 350,813 | 4.030% | 6.8% | 10.0% | 10.0% | 10.0% | 11.111% | 5.138 | 32,633 | 21,765 | 565.0 |
| 8 | 981 | 987.17 | 984.40 | 2.770 | 277 | 375 | 606 | 135,807 | 137,959 | 354,135 | 4.016% | 7.2% | 11.0% | 11.0% | 10.0% | 12.222% | 5.328 | 37,959 | 25,306 | 642.8 |
| 9 | 1,089 | 984.40 | 981.36 | 3,046 | 305 | 429 | 660 | 140,774 | 143,448 | 357,609 | 3.979% | 7.6% | 11.0% | 11.0% | 10.0% | 12.222% | 5.490 | 43,448 | 28.965 | 660.5 |
| 10 | 1,203 | 981.36 | 978.02 | 3,332 | 333 | 488 | 715 | 145,862 | 149,139 | 361,002 | 3.967% | 8.0% | 12.0% | 12.0% | 10.0% | 13.333% | 5.691 | 49,139 | 32,759 | 744.6 |
| 11 | 1,323 | 978.02 | 974.40 | 3,628 | 363 | 552 | 771 | 151,039 | 155,007 | 364,600 | 3.935% | 8.4% | 12.0% | 12.0% | 0.0% | 12.000% | 5.868 | 55,007 | 36,672 | 688.7 |
| 12 | 1,449 | 974.40 | 970.46 | 3,937 | 394 | 623 | 827 | 156,332 | 161,091 | 368,165 | 3.925% | 8.8% | 13.0% | 13.0% | 0.0% | 13.000% | 6.084 | 61,091 | 40.727 | 770.6 |
| 13 | 1,583 | 970.46 | 966.20 | 4.257 | 426 | 700 | 883 | 161,710 | 167,367 | 371,895 | 3.896% | 9.2% | 13.0% | 13.0% | 0.0% | 13.000% | 6.276 | 67,367 | 44,911 | 791.7 |
| 14 | 1,726 | 966.20 | 961.61 | 4,594 | 459 | 785 | 941 | 167,197 | 173,872 | 375,747 | 3.887% | 9.6% | 14.0% | 14.0% | 0.0% | 14.000% | 6.506 | 73,872 | 49,248 | 880.0 |
| 15 | 1,862 | 961.61 | 956.65 | 4.956 | 496 | 880 | 1,002 | 172,755 | 180,582 | 379,650 | 3.859% | 10.0% | 15.0% | 15.0% | 0.0% | 15.000% | 6.710 | 80,582 | 53,722 | 967.9 |
| 16 | 2,055 | 956.65 | 951.29 | 5,357 | 536 | 988 | 1,068 | 178,397 | 187,631 | 383,665 | 3.848% | 10.4% | 15.0% | 15.0% | 0.0% | 15.000% | 6.948 | 87,631 | 58,354 | 997.1 |
| 17 | 2,254 | 951.29 | 946.48 | 5,811 | 581 | 1,112 | 1,141 | 184,073 | 194,686 | 387,823 | 3.816% | 10.8% | 16.0% | 16.0% | 0.0% | 16.000% | 7.156 | 94,686 | 63.124 | 1,086.1 |
| 18 | 2,460 | 945.48 | 939.16 | 6,328 | 633 | 1,258 | 1,223 | 189,784 | 202,080 | 391,933 | 3.798% | 11.2% | 17.0% | 17.0% | 0.0% | 17.000% | 7.394 | 102,080 | 68,053 | 1,183.4 |
| 19 | 2,741 | 939.16 | 932.24 | 6,921 | 692 | 1,428 | 1,314 | 195,487 | 209,676 | 396,127 | 3.759% | 11.6% | 17.0% | 17.0% | 0.0% | 17.000% | 7.596 | 109,676 | 73,117 | 1,212.8 |
| 20 | 3,043 | 932.24 | 924.63 | 7,601 | 760 | 1,627 | 1,416 | 201,109 | 217,501 | 400,345 | 3.732% | 12.0% | 18.0% | 18.0% | 0.0% | 18.000% | 7.825 | 117,501 | 78,334 | 0.0 |
| 21 | 3,393 | 924.63 | 916.25 | 8,383 | 838 | 1,868 | 1,525 | 207,366 | 226,319 | 404,728 | 3.732% | 12.0% | 18.0% | 18.0% | 0.0% | 18.000% | 8.818 | 117,501 | 78,334 | 0.0 |
| 22 | 3,809 | 916.25 | 906.97 | 9,276 | 928 | 2,151 | 1,558 | 213,511 | 235,410 | 410,600 | 3.816% | 12.0% | 19.0% | 19.0% | 0.0% | 19.000% | 9.090 | 117,501 | 78,334 | 0.0 |
| 23 | 4,287 | 906.97 | 896.68 | 10,291 | 1,029 | 2,462 | 1,806 | 218,445 | 244,730 | 416,604 | 3.959% | 12.0% | 19.0% | 19.0% | 0.0% | 19.000% | 9.320 | 117,501 | 78,334 | 0.0 |
| 24 | 4,831 | 896.68 | 885.25 | 11,429 | 1,143 | 2,865 | 1,966 | 225,121 | 254,301 | 422,685 | 3.911% | 12.0% | 20.0% | 20.0% | 0.0% | 20.000% | 9.571 | 117,501 | 78,334 | 0.0 |
| 25 | 5,436 | 885.25 | 872.58 | 12,677 | 1,268 | 3,302 | 2,134 | 230,433 | 264,083 | 428,828 | 3.847% | 12.0% | 20.0% | 20.0% | 0.0% | 20.000% | 9.762 | 117,501 | 78,334 | 0.0 |
| 26 | 6,099 | 872.58 | 858.56 | 14,014 | 1,401 | 3,791 | 2,308 | 235,334 | 274,101 | 435,236 | 3.794% | 12.0% | 20.0% | 20.0% | 0.0% | 20.000% | 10,016 | 117,501 | 78,334 | 0.0 |
| 27 | 6,808 | 858.56 | 843.15 | 15,418 | 1,542 | 4,329 | 2,479 | 239,726 | 284,324 | 441,550 | 3.729% | 12.0% | 20.0% | 20.0% | 0.0% | 20.000% | 10.222 | 117,501 | 78,334 | 0.0 |
| 28 | 7,609 | 843.15 | 826.15 | 16,992 | 1,699 | 4,949 | 2,661 | 243,520 | 294,764 | 447,824 | 3.672% | 12.0% | 20.0% | 20.0% | 0.0% | 20.000% | 10,440 | 117,501 | 78,334 | 0.0 |
| 29 | 8,213 | 826.15 | 808.07 | 18,082 | 1,808 | 5,460 | 2,753 | 246,865 | 305,499 | 454,187 | 3.642% | 12.0% | 20.0% | 20.0% | 0.0% | 20.000% | 10,735 | 117,501 | 78,334 | 0.0 |
| 30 | 9,162 | 808.07 | 788.18 | 19,888 | 1,989 | 6,224 | 2,939 | 249,404 | 316,428 | 460,693 | 3.578% | 12.0% | 20.0% | 20.0% | 0.0% | 20.000% | 10,929 | 117,501 | 78,334 | 0.0 |
| 31 | 10,048 | 788.18 | 766.68 | 21,501 | 2,150 | 6,969 | 3,078 | 251,145 | 327,574 | 467,302 | 3.522% | 12.0% | 20.0% | 20.0% | 0.0% | 20.000% | 11,146 | 117,501 | 78,334 | 0.0 |
| 32 | 11,003 | 766.68 | 743.47 | 23,208 | 2,321 | 7,768 | 3,216 | 251,997 | 338,945 | 474,098 | 3.471% | 12.0% | 20.0% | 20.0% | 0.0% | 20.000% | 11,371 | 117,501 | 78,334 | 0.0 |
| 33 | 12,038 | 743.47 | 718.46 | 25,015 | 2,502 | 8,686 | 3,353 | 251,815 | 350,493 | 481,234 | 3.407% | 12.0% | 20.0% | 20.0% | 0.0% | 20.000% | 11,649 | 117,501 | 78,334 | 0.0 |
| 34 | 13,141 | 718.46 | 691.55 | 26,910 | 2,691 | 9,662 | 3,480 | 250,499 | 362,228 | 486,342 | 3.349% | 12.0% | 20.0% | 20.0% | 0.0% | 20.000% | 11,735 | 117,501 | 78,334 | 0.0 |
| 35 | 14,300 | 691.55 | 662.71 | 28,834 | 2,883 | 10,699 | 3,601 | 247,917 | 374,093 | 485,945 | 3.276% | 12.0% | 20.0% | 20.0% | 0.0% | 20.000% | 11,865 | 117,501 | 78,334 | 0.0 |
| 36 | 15,467 | 662.71 | 632.00 | 30,718 | 3,072 | 11,771 | 3,666 | 244,020 | 386,109 | 503,530 | 3.212% | 12.0% | 20.0% | 20.0% | 0.0% | 20.000% | 12,016 | 117,501 | 78,334 | 0.0 |
| 37 | 16,613 | 632.00 | 599.51 | 32,492 | 3,249 | 12,851 | 3,762 | 238,241 | 398,241 | 511,286 | 3.142% | 12.0% | 20.0% | 20.0% | 0.0% | 20.000% | 12,132 | 117,501 | 78,334 | 0.0 |
| 38 | 17,693 | 599.51 | 565.42 | 34,087 | 3,409 | 13,806 | 3,768 | 232,119 | 410,528 | 519,068 | 3.085% | 12.0% | 20.0% | 20.0% | 0.0% | 20.000% | 12,285 | 117,501 | 78,334 | 0.0 |
| 39 | 18,680 | 565.42 | 529.98 | 35,440 | 3,544 | 14,904 | 3,777 | 224,147 | 422,936 | 527,095 | 3.023% | 12.0% | 20.0% | 20.0% | 0.0% | 20.000% | 12,410 | 117,501 | 78,334 | 0.0 |
| 40 | 19,530 | 529.98 | 493.49 | 36,489 | 3,649 | 15,808 | 3,721 | 214,927 | 435,525 | 535,226 | 2.977% | 12.0% | 20.0% | 20.0% | 0.0% | 20.000% | 12,589 | 117,501 | 78,334 | 0.0 |
| 41 | 20,216 | 493.49 | 456.31 | 37,182 | 3,718 | 16,588 | 3,628 | 204,648 | 448,267 | 543,710 | 2.926% | 12.0% | 20.0% | 20.0% | 0.0% | 20.000% | 12,589 | 117,501 | 78,334 | 0.0 |
| 42 | 20,693 | 456.31 | 418.83 | 37,480 | 3,748 | 17,210 | 3,483 | 193,188 | 461,260 | 552,108 | 2.893% | 12.0% | 20.0% | 20.0% | 0.0% | 20.000% | 12,742 | 117,501 | 78,334 | 0.0 |
| 43 | 20,965 | 418.83 | 381.47 | 37,361 | 3,736 | 17,653 | 3,312 | 180,992 | 474,463 | 561,145 | 2.862% | 12.0% | 20.0% | 20.0% | 0.0% | 20.000% | 12,992 | 117,501 | 78,334 | 0.0 |
| 44 | 21,064 | 381.47 | 344.56 | 36,910 | 3,691 | 17,939 | 3,125 | 168,115 | 487,618 | 570,684 | 2.836% | 12.0% | 20.0% | 20.0% | 0.0% | 20.000% | 13,203 | 117,501 | 78,334 | 0.0 |
| 45 | 20,942 | 344.56 | 308.47 | 36,086 | 3,609 | 18,036 | 2,906 | 154,734 | 501,616 | 580,329 | 2.808% | 12.0% | 20.0% | 20.0% | 0.0% | 20.000% | 13,698 | 117,501 | 78,334 | 0.0 |

| 46 | 20,635 | 308.47 | 273.54 | 34.932 | 3,493 | 17,849 | 2,686 | 141,031 | 515.579 | 590.728 | 2.784% | 12.0% | 20.0% | 20.0% | 0.0% | 20.000% | 13.963 | 117.501 | 78.334 | 0.0 |
| --- | --- | --- | --- | --- | --- | --- | --- | --- | --- | --- | --- | --- | --- | --- | --- | --- | --- | --- | --- | --- |
| 47 | 20,140 | 273.54 | 240.02 | 33.514 | 3,351 | 17,700 | 2,440 | 127,166 | 529.805 | 600.959 | 2.759% | 12.0% | 20.0% | 20.0% | 0.0% | 20.000% | 14.226 | 117.501 | 78.334 | 0.0 |
| 48 | 19,463 | 240.02 | 208.22 | 31.801 | 3,180 | 17,259 | 2,204 | 113,336 | 544.301 | 612.030 | 2.736% | 12.0% | 20.0% | 20.0% | 0.0% | 20.000% | 14.496 | 117.501 | 78.334 | 0.0 |
| 49 | 18,726 | 208.22 | 178.44 | 29.781 | 2,978 | 16,605 | 2,121 | 99,579 | 558.047 | 628.776 | 2.525% | 12.0% | 20.0% | 20.0% | 0.0% | 20.000% | 13.746 | 117.501 | 78.334 | 0.0 |
| 50 | 17,732 | 178.44 | 150.94 | 27.506 | 2,751 | 15,723 | 2,008 | 86,189 | 571.026 | 644.656 | 2.326% | 12.0% | 20.0% | 20.0% | 0.0% | 20.000% | 12.979 | 117.501 | 78.334 | 0.0 |
| 51 | 16,616 | 150.94 | 125.90 | 25.037 | 2,504 | 14,645 | 1,870 | 73,385 | 582.884 | 659.649 | 2.077% | 12.0% | 20.0% | 20.0% | 0.0% | 20.000% | 11.858 | 117.501 | 78.334 | 0.0 |
| 52 | 15,216 | 125.90 | 103.30 | 22.597 | 2,260 | 13,492 | 1,723 | 61,309 | 593.485 | 673.347 | 1.819% | 12.0% | 20.0% | 20.0% | 0.0% | 20.000% | 10.601 | 117.501 | 78.334 | 0.0 |
| 53 | 13,768 | 103.30 | 83.22 | 20.082 | 2,008 | 12,209 | 1,559 | 50,121 | 602.268 | 685.593 | 1.480% | 12.0% | 20.0% | 20.0% | 0.0% | 20.000% | 8.781 | 117.501 | 78.334 | 0.0 |
| 54 | 12,095 | 83.22 | 65.84 | 17.384 | 1,738 | 10,725 | 1,370 | 40,124 | 609.447 | 695.738 | 1.192% | 12.0% | 20.0% | 20.0% | 0.0% | 20.000% | 7.181 | 117.501 | 78.334 | 0.0 |
| 55 | 10,399 | 65.84 | 51.07 | 14.771 | 1,477 | 9,222 | 1,178 | 31,372 | 614.340 | 704.033 | 0.803% | 12.0% | 20.0% | 20.0% | 0.0% | 20.000% | 4.882 | 117.501 | 78.334 | 0.0 |
| 56 | 38,241 | 61.07 | 0.00 | 51.066 | 5,107 | 32,141 | 4,100 | 0 | 0.000 | 709.686 | 0.000% | 12.0% | 20.0% | 20.0% | 0.0% | 20.000% | 0.000 | 117.501 | 78.334 | 0.0 |
| 57 | 0 | 0.00 | 0.00 | 0.000 | 0 | 0 | 0 | 0 | 0.000 | 0.000 | 0.000% | 12.0% | 20.0% | 20.0% | 0.0% | 20.000% | 0.000 | 117.501 | 78.334 | 0.0 |
| 58 | 0 | 0.00 | 0.00 | 0.000 | 0 | 0 | 0 | 0 | 0.000 | 0.000 | 0.000% | 12.0% | 20.0% | 20.0% | 0.0% | 20.000% | 0.000 | 117.501 | 78.334 | 0.0 |
| 59 | 0 | 0.00 | 0.00 | 0.000 | 0 | 0 | 0 | 0 | 0.000 | 0.000 | 0.000% | 12.0% | 20.0% | 20.0% | 0.0% | 20.000% | 0.000 | 117.501 | 78.334 | 0.0 |
| 60 | 0 | 0.00 | 0.00 | 0.000 | 0 | 0 | 0 | 0 | 0.000 | 0.000 | 0.000% | 12.0% | 20.0% | 20.0% | 0.0% | 20.000% | 0.000 | 117.501 | 78.334 | 0.0 |

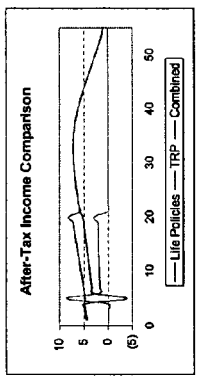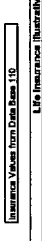
Figure 5: Pricing Benefits Output (208)
One possible example of the the calculation of the price of the the tax recovery product

Figure 6A Actuarial Assumptions (204)

| Mortality Table | 1983 GAMM |
|---|---|
| Lapse Rate | 0.00% |
| Earnings Rate | 5.00% |
| Return on Equity Target | 12.00% |
| Morbidity Rate | N/A |

Mortality Tables

| Age Calc | ANB | ANB | ANB | ANB | ANB | ANB | ANB | ALB | ALB | | | | | | | | |
|---|---|---|---|---|---|---|---|---|---|---|---|---|---|---|---|---|---|
| Age | 80CSOMU | 80CSOFU | 80CSOMN | 80CSOFN | 80CSOMS | 80CSOFS | 83GAMM | 83GAMF | 80CSOMU | 80CSOFU | 7580MUU | 7580FUU | 2001 CSO MU | 2001 CSO FU | 2001 VBT MU | 2001 VBT FU | 80CSO-B N | 80CSO UNISEX NON | 80CSO UNISEX SM | Age |
| 20 | 0.0019 | 0.00105 | 0.001680 | 0.00101 | 0.00116 | 0.00118 | 0.000377 | 0.0001189 | 0.0019 | 0.00106 | 0.00139 | 0.00052 | 0.001 | 0.00047 | 0.0009 | 0.00038 | 0.00174 | 0.00165 | 0.00209 | 20 |
| 21 | 0.00191 | 0.00107 | 0.001670 | 0.00102 | 0.00233 | 0.00118 | 0.000392 | 0.0000201 | 0.00188 | 0.00108 | 0.00141 | 0.00053 | 0.001 | 0.00048 | 0.0009 | 0.00039 | 0.00175 | 0.00155 | 0.0021 | 21 |
| 22 | 0.00189 | 0.00109 | 0.001640 | 0.00104 | 0.0023 | 0.00121 | 0.000408 | 0.0000212 | 0.00188 | 0.0011 | 0.00141 | 0.00053 | 0.00102 | 0.0005 | 0.00091 | 0.0004 | 0.00173 | 0.00152 | 0.00209 | 22 |
| 23 | 0.00186 | 0.00111 | 0.001610 | 0.00105 | 0.00226 | 0.00123 | 0.000424 | 0.0000225 | 0.00184 | 0.00112 | 0.00141 | 0.00053 | 0.00102 | 0.0005 | 0.00092 | 0.0004 | 0.00171 | 0.0015 | 0.00206 | 23 |
| 24 | 0.00182 | 0.00114 | 0.001570 | 0.00108 | 0.00221 | 0.00127 | 0.000444 | 0.0000239 | 0.0018 | 0.00115 | 0.00136 | 0.00053 | 0.00103 | 0.00052 | 0.00093 | 0.00041 | 0.00169 | 0.00147 | 0.00203 | 24 |
| 25 | 0.00177 | 0.00116 | 0.001520 | 0.00109 | 0.00214 | 0.00129 | 0.000464 | 0.0000253 | 0.00175 | 0.00117 | 0.00132 | 0.00053 | 0.00105 | 0.00054 | 0.00095 | 0.00042 | 0.00165 | 0.00144 | 0.00197 | 25 |
| 26 | 0.00173 | 0.00119 | 0.001480 | 0.00112 | 0.00208 | 0.00134 | 0.000488 | 0.0000268 | 0.00172 | 0.0012 | 0.00127 | 0.00053 | 0.00107 | 0.00056 | 0.00099 | 0.00044 | 0.00163 | 0.00141 | 0.00193 | 26 |
| 27 | 0.00171 | 0.00122 | 0.001460 | 0.00114 | 0.00206 | 0.00138 | 0.000513 | 0.0000284 | 0.00171 | 0.00124 | 0.00122 | 0.00053 | 0.00112 | 0.0006 | 0.00099 | 0.00044 | 0.00161 | 0.0014 | 0.00192 | 27 |
| 28 | 0.0017 | 0.00126 | 0.001440 | 0.00117 | 0.00204 | 0.00142 | 0.000542 | 0.0000302 | 0.0017 | 0.00128 | 0.00119 | 0.00054 | 0.00117 | 0.0006 | 0.00102 | 0.00047 | 0.00161 | 0.00138 | 0.00192 | 28 |
| 29 | 0.00171 | 0.00131 | 0.001440 | 0.00121 | 0.00206 | 0.00148 | 0.000572 | 0.0000320 | 0.00172 | 0.00132 | 0.00116 | 0.00055 | 0.00115 | 0.00066 | 0.00099 | 0.00049 | 0.00163 | 0.0014 | 0.00194 | 29 |
| 30 | 0.00173 | 0.00135 | 0.001440 | 0.00124 | 0.0021 | 0.00155 | 0.000607 | 0.0000342 | 0.00175 | 0.00137 | 0.00113 | 0.00057 | 0.00114 | 0.00068 | 0.00097 | 0.00052 | 0.00165 | 0.0014 | 0.00199 | 30 |
| 31 | 0.00178 | 0.0014 | 0.001470 | 0.00127 | 0.00217 | 0.00161 | 0.000645 | 0.0000364 | 0.0018 | 0.00142 | 0.00112 | 0.0006 | 0.00113 | 0.00073 | 0.00095 | 0.00053 | 0.0017 | 0.00143 | 0.00206 | 31 |
| 32 | 0.00183 | 0.00145 | 0.001500 | 0.00131 | 0.00224 | 0.00168 | 0.000687 | 0.0000388 | 0.00187 | 0.00147 | 0.00112 | 0.00063 | 0.00113 | 0.00077 | 0.00094 | 0.0006 | 0.00175 | 0.00148 | 0.00213 | 32 |
| 33 | 0.0019 | 0.0015 | 0.001550 | 0.00135 | 0.00235 | 0.00175 | 0.000734 | 0.0000414 | 0.00195 | 0.00154 | 0.00113 | 0.00068 | 0.00115 | 0.00082 | 0.00095 | 0.00064 | 0.00183 | 0.0015 | 0.00223 | 33 |
| 34 | 0.002 | 0.00158 | 0.001610 | 0.00142 | 0.00248 | 0.00185 | 0.000785 | 0.0000443 | 0.00205 | 0.00161 | 0.00116 | 0.00074 | 0.00118 | 0.00088 | 0.00097 | 0.00069 | 0.00191 | 0.00158 | 0.00235 | 34 |
| 35 | 0.00211 | 0.00165 | 0.001690 | 0.00147 | 0.00263 | 0.00194 | 0.000860 | 0.0000476 | 0.00217 | 0.00167 | 0.0012 | 0.00081 | 0.00121 | 0.00097 | 0.00099 | 0.00076 | 0.00202 | 0.00164 | 0.0025 | 35 |
| 36 | 0.00224 | 0.00176 | 0.001770 | 0.00156 | 0.00281 | 0.00209 | 0.000907 | 0.0000502 | 0.00232 | 0.00182 | 0.00125 | 0.00088 | 0.00128 | 0.00103 | 0.00104 | 0.00081 | 0.00214 | 0.00173 | 0.00267 | 36 |
| 37 | 0.0024 | 0.00189 | 0.001880 | 0.00167 | 0.00304 | 0.00228 | 0.000966 | 0.0000536 | 0.00249 | 0.00196 | 0.00132 | 0.00096 | 0.00134 | 0.00111 | 0.00109 | 0.00088 | 0.0023 | 0.00183 | 0.00289 | 37 |
| 38 | 0.00258 | 0.00204 | 0.002000 | 0.00179 | 0.0033 | 0.00249 | 0.001039 | 0.0000573 | 0.00268 | 0.00213 | 0.00141 | 0.00109 | 0.00144 | 0.00117 | 0.00117 | 0.00092 | 0.00247 | 0.00196 | 0.00314 | 38 |
| 39 | 0.00279 | 0.00222 | 0.002140 | 0.00193 | 0.0036 | 0.00273 | 0.001128 | 0.0000617 | 0.0029 | 0.00232 | 0.00151 | 0.00122 | 0.00154 | 0.00123 | 0.00125 | 0.00097 | 0.00268 | 0.0021 | 0.00343 | 39 |
| 40 | 0.00302 | 0.00242 | 0.002290 | 0.00208 | 0.00394 | 0.003 | 0.001238 | 0.0000665 | 0.00315 | 0.00253 | 0.00163 | 0.00137 | 0.00165 | 0.0013 | 0.00134 | 0.00102 | 0.00288 | 0.00225 | 0.00375 | 40 |
| 41 | 0.00329 | 0.00264 | 0.002470 | 0.00226 | 0.00434 | 0.00333 | 0.001370 | 0.0000716 | 0.00342 | 0.00275 | 0.00179 | 0.00154 | 0.00179 | 0.00138 | 0.00146 | 0.00108 | 0.00316 | 0.00243 | 0.00414 | 41 |
| 42 | 0.00356 | 0.00287 | 0.002650 | 0.00244 | 0.00475 | 0.00364 | 0.001527 | 0.0000775 | 0.00371 | 0.00298 | 0.00197 | 0.00171 | 0.00196 | 0.00148 | 0.00161 | 0.00116 | 0.00342 | 0.0026 | 0.00453 | 42 |
| 43 | 0.00387 | 0.00309 | 0.002860 | 0.00262 | 0.00522 | 0.00396 | 0.001715 | 0.0000842 | 0.00403 | 0.0032 | 0.00219 | 0.00188 | 0.00215 | 0.00159 | 0.00178 | 0.00125 | 0.00372 | 0.00281 | 0.00497 | 43 |
| 44 | 0.00419 | 0.00332 | 0.003070 | 0.0028 | 0.00571 | 0.00428 | 0.001932 | 0.0000919 | 0.00437 | 0.00344 | 0.00245 | 0.00205 | 0.00239 | 0.00172 | 0.00199 | 0.00136 | 0.00401 | 0.00301 | 0.00542 | 44 |
| 45 | 0.00455 | 0.00356 | 0.003320 | 0.00299 | 0.00627 | 0.00461 | 0.002183 | 0.0001010 | 0.00473 | 0.00368 | 0.00274 | 0.00224 | 0.00265 | 0.00187 | 0.00222 | 0.00149 | 0.00435 | 0.00326 | 0.00594 | 45 |
| 46 | 0.00492 | 0.0038 | 0.003590 | 0.00319 | 0.00683 | 0.00495 | 0.002471 | 0.0001117 | 0.00512 | 0.00392 | 0.00307 | 0.00243 | 0.0029 | 0.00205 | 0.00244 | 0.00164 | 0.0047 | 0.00351 | 0.00645 | 46 |
| 47 | 0.00532 | 0.00405 | 0.003880 | 0.00341 | 0.00744 | 0.00531 | 0.002790 | 0.0001237 | 0.00553 | 0.00419 | 0.00343 | 0.00262 | 0.00317 | 0.00227 | 0.00268 | 0.00183 | 0.00507 | 0.00378 | 0.00701 | 47 |
| 48 | 0.00574 | 0.00433 | 0.004190 | 0.00365 | 0.00808 | 0.00568 | 0.003138 | 0.0001366 | 0.00597 | 0.00448 | 0.00382 | 0.00283 | 0.00333 | 0.0025 | 0.00281 | 0.00204 | 0.00545 | 0.00409 | 0.0076 | 48 |
| 49 | 0.00621 | 0.00463 | 0.004540 | 0.0039 | 0.0088 | 0.00608 | 0.003513 | 0.0001505 | 0.00646 | 0.00479 | 0.00424 | 0.00305 | 0.00352 | 0.00278 | 0.00296 | 0.00228 | 0.00589 | 0.00441 | 0.00825 | 49 |
| 50 | 0.00671 | 0.00496 | 0.004910 | 0.00419 | 0.00956 | 0.00654 | 0.003909 | 0.0001647 | 0.007 | 0.00513 | 0.00469 | 0.0033 | 0.00376 | 0.00308 | 0.00317 | 0.00255 | 0.00636 | 0.00476 | 0.00895 | 50 |
| 51 | 0.0073 | 0.00531 | 0.005350 | 0.0045 | 0.01044 | 0.007 | 0.004324 | 0.0001793 | 0.00763 | 0.00547 | 0.00518 | 0.00357 | 0.00406 | 0.00341 | 0.00343 | 0.00285 | 0.0069 | 0.00518 | 0.00974 | 51 |
| 52 | 0.00796 | 0.0057 | 0.005860 | 0.00485 | 0.01142 | 0.00752 | 0.004755 | 0.0001949 | 0.00833 | 0.00592 | 0.00572 | 0.00388 | 0.00447 | 0.00379 | 0.00379 | 0.00319 | 0.0075 | 0.00565 | 0.01063 | 52 |
| 53 | 0.00871 | 0.00615 | 0.006430 | 0.00526 | 0.01254 | 0.00813 | 0.005200 | 0.0002120 | 0.00913 | 0.00638 | 0.00631 | 0.00422 | 0.00493 | 0.0042 | 0.00356 | 0.00819 | 0.00619 | 0.01164 | 53 |
| 54 | 0.00956 | 0.00661 | 0.007090 | 0.00568 | 0.0138 | 0.00875 | 0.005660 | 0.0002315 | 0.01001 | 0.00685 | 0.00694 | 0.0046 | 0.0055 | 0.00463 | 0.00472 | 0.00395 | 0.00895 | 0.00681 | 0.01277 | 54 |
| 55 | 0.01047 | 0.00709 | 0.007820 | 0.00613 | 0.01514 | 0.0094 | 0.006131 | 0.0002541 | 0.01096 | 0.00733 | 0.00764 | 0.00502 | 0.00617 | 0.0051 | 0.00534 | 0.00437 | 0.00978 | 0.00748 | 0.01396 | 55 |
| 56 | 0.01146 | 0.00757 | 0.008630 | 0.00659 | 0.01659 | 0.01005 | 0.006618 | 0.0002803 | 0.01197 | 0.0078 | 0.00842 | 0.00547 | 0.00688 | 0.00563 | 0.00599 | 0.00485 | 0.01067 | 0.00821 | 0.01524 | 56 |
| 57 | 0.01249 | 0.00803 | 0.009490 | 0.00705 | 0.01809 | 0.01067 | 0.007139 | 0.0003103 | 0.01304 | 0.00825 | 0.00928 | 0.00596 | 0.00764 | 0.00619 | 0.00668 | 0.00536 | 0.01158 | 0.00984 | 0.01655 | 57 |
| 58 | 0.01359 | 0.00884 | 0.010420 | 0.00749 | 0.01969 | 0.01125 | 0.007719 | 0.0003443 | 0.01418 | 0.0087 | 0.01024 | 0.0065 | 0.00827 | 0.00678 | 0.00724 | 0.00591 | 0.01254 | 0.01075 | 0.01793 | 58 |
| 59 | 0.01477 | 0.00894 | 0.011470 | 0.00796 | 0.02135 | 0.01185 | 0.008384 | 0.0003821 | 0.01542 | 0.0092 | 0.0132 | 0.00708 | 0.00899 | 0.00739 | 0.00789 | 0.00644 | 0.01357 | 0.01357 | 0.01936 | 59 |
| 60 | 0.01608 | 0.00947 | 0.012640 | 0.00851 | 0.02319 | 0.01251 | 0.009158 | 0.0004241 | 0.0168 | 0.00986 | 0.01253 | 0.00769 | 0.00986 | 0.00801 | 0.00868 | 0.007 | 0.01472 | 0.0118 | 0.02093 | 60 |
| 61 | 0.01754 | 0.01013 | 0.013940 | 0.00916 | 0.02526 | 0.01336 | 0.010064 | 0.0004703 | 0.01836 | 0.01054 | 0.01387 | 0.00834 | 0.01094 | 0.00868 | 0.00967 | 0.0076 | 0.016 | 0.01296 | 0.02272 | 61 |
| 62 | 0.01919 | 0.01096 | 0.015420 | 0.00988 | 0.02759 | 0.01439 | 0.011133 | 0.0005210 | 0.02012 | 0.01149 | 0.01532 | 0.00903 | 0.01225 | 0.00939 | 0.01088 | 0.00824 | 0.01747 | 0.01435 | 0.02475 | 62 |
| 63 | 0.02106 | 0.01202 | 0.017110 | 0.01101 | 0.03023 | 0.01578 | 0.012391 | 0.0005769 | 0.02209 | 0.01263 | 0.01689 | 0.00977 | 0.01371 | 0.01014 | 0.01224 | 0.00891 | 0.01916 | 0.01586 | 0.02709 | 63 |
| 64 | 0.02314 | 0.01325 | 0.019020 | 0.01223 | 0.03314 | 0.01733 | 0.013868 | 0.0006388 | 0.02427 | 0.01392 | 0.01861 | 0.01057 | 0.01524 | 0.01096 | 0.01366 | 0.00964 | 0.02105 | 0.01762 | 0.02966 | 64 |
| 65 | 0.02542 | 0.01459 | 0.021130 | 0.01355 | 0.03629 | 0.01907 | 0.015592 | 0.0007064 | 0.02662 | 0.01529 | 0.02049 | 0.01145 | 0.01685 | 0.01185 | 0.01515 | 0.01044 | 0.02311 | 0.01955 | 0.03245 | 65 |

Figure 6B

| | | | | | | | | | | | | | | | |
|---|---|---|---|---|---|---|---|---|---|---|---|---|---|---|---|
| 0.02785 | 0.016 | 0.023400 | 0.014497 | 0.03957 | 0.02079 | 0.017579 | 0.007817 | 0.02913 | 0.01671 | 0.02256 | 0.01242 | 0.01847 | 0.01282 | 0.01663 | 0.01131 | 0.02529 | 0.02164 | 0.03533 | 66 |
| 0.03044 | 0.01743 | 0.025860 | 0.01641 | 0.04301 | 0.02258 | 0.019804 | 0.008681 | 0.03179 | 0.01813 | 0.02485 | 0.01348 | 0.02009 | 0.01389 | 0.01811 | 0.01227 | 0.02761 | 0.02387 | 0.03833 | 67 |
| 0.03319 | 0.01884 | 0.028500 | 0.01786 | 0.04655 | 0.0242 | 0.022229 | 0.009702 | 0.03465 | 0.01959 | 0.02737 | 0.01464 | 0.02185 | 0.01507 | 0.01971 | 0.01333 | 0.03003 | 0.02624 | 0.04134 | 68 |
| 0.03617 | 0.02036 | 0.031390 | 0.01941 | 0.05032 | 0.02602 | 0.024817 | 0.010922 | 0.03781 | 0.02123 | 0.03013 | 0.01594 | 0.02364 | 0.01636 | 0.02133 | 0.01449 | 0.03268 | 0.02882 | 0.04456 | 69 |
| 0.03951 | 0.02211 | 0.034630 | 0.0212 | 0.05448 | 0.02795 | 0.027530 | 0.012850 | 0.04137 | 0.02316 | 0.03313 | 0.01742 | 0.02577 | 0.01781 | 0.02327 | 0.0158 | 0.03559 | 0.03174 | 0.04808 | 70 |
| 0.03951 | 0.02423 | 0.038910 | 0.02334 | 0.05909 | 0.03045 | 0.030354 | 0.014128 | 0.04543 | 0.02553 | 0.03634 | 0.01913 | 0.02815 | 0.01947 | 0.02544 | 0.01731 | 0.03895 | 0.03551 | 0.05202 | 71 |
| 0.04765 | 0.02687 | 0.042560 | 0.02599 | 0.06433 | 0.03355 | 0.033370 | 0.016160 | 0.05008 | 0.02847 | 0.0398 | 0.02111 | 0.03132 | 0.0213 | 0.02838 | 0.01897 | 0.04294 | 0.03989 | 0.05656 | 72 |
| 0.05264 | 0.03011 | 0.047440 | 0.02922 | 0.07023 | 0.03733 | 0.036680 | 0.018481 | 0.05534 | 0.03199 | 0.04357 | 0.02341 | 0.03462 | 0.02233 | 0.03143 | 0.02079 | 0.04733 | 0.04337 | 0.06172 | 73 |
| 0.05819 | 0.03393 | 0.052920 | 0.03302 | 0.07666 | 0.04174 | 0.040388 | 0.021092 | 0.0611 | 0.03605 | 0.04772 | 0.02609 | 0.03808 | 0.0255 | 0.03461 | 0.02278 | 0.05237 | 0.04839 | 0.06739 | 74 |
| 0.06419 | 0.03824 | 0.058800 | 0.03732 | 0.08377 | 0.04664 | 0.044597 | 0.023992 | 0.06725 | 0.04056 | 0.05231 | 0.0292 | 0.04191 | 0.0279 | 0.03814 | 0.02497 | 0.05784 | 0.05384 | 0.07364 | 75 |
| 0.07053 | 0.04297 | 0.065060 | 0.04204 | 0.0911 | 0.05192 | 0.049388 | 0.027185 | 0.0737 | 0.04545 | 0.05737 | 0.03278 | 0.04608 | 0.03053 | 0.04196 | 0.02736 | 0.06365 | 0.05965 | 0.08011 | 76 |
| 0.07712 | 0.04804 | 0.071640 | 0.04711 | 0.09852 | 0.05746 | 0.054758 | 0.030672 | 0.08037 | 0.05068 | 0.06294 | 0.03688 | 0.05092 | 0.03341 | 0.04642 | 0.02998 | 0.0697 | 0.06577 | 0.08664 | 77 |
| 0.0839 | 0.05345 | 0.078470 | 0.05253 | 0.10591 | 0.06323 | 0.060678 | 0.034459 | 0.08732 | 0.05632 | 0.06902 | 0.04154 | 0.05656 | 0.03658 | 0.05164 | 0.03286 | 0.07595 | 0.07213 | 0.09317 | 78 |
| 0.09105 | 0.05935 | 0.085720 | 0.05845 | 0.11349 | 0.06941 | 0.067125 | 0.038849 | 0.09476 | 0.06257 | 0.0756 | 0.04674 | 0.06306 | 0.04005 | 0.05767 | 0.03601 | 0.08257 | 0.07892 | 0.09991 | 79 |
| 0.09884 | 0.06599 | 0.093670 | 0.06512 | 0.12159 | 0.07626 | 0.074070 | 0.042945 | 0.10294 | 0.06967 | 0.08269 | 0.0525 | 0.07014 | 0.04386 | 0.06423 | 0.03946 | 0.08983 | 0.0864 | 0.10714 | 80 |
| 0.10748 | 0.0736 | 0.102520 | 0.07276 | 0.13041 | 0.084 | 0.081484 | 0.047655 | 0.11209 | 0.07783 | 0.09024 | 0.0588 | 0.07819 | 0.04911 | 0.0717 | 0.04432 | 0.09794 | 0.09477 | 0.11511 | 81 |
| 0.11725 | 0.0824 | 0.112520 | 0.08159 | 0.1402 | 0.09284 | 0.089320 | 0.052691 | 0.12241 | 0.08725 | 0.09824 | 0.06568 | 0.08654 | 0.05495 | 0.07941 | 0.04973 | 0.10718 | 0.10426 | 0.12403 | 82 |
| 0.12826 | 0.09253 | 0.123790 | 0.09176 | 0.15103 | 0.10287 | 0.097525 | 0.058071 | 0.13384 | 0.0979 | 0.10688 | 0.07306 | 0.09551 | 0.06081 | 0.08767 | 0.05511 | 0.11765 | 0.11502 | 0.13401 | 83 |
| 0.14025 | 0.10381 | 0.136110 | 0.10303 | 0.16249 | 0.11465 | 0.106047 | 0.063807 | 0.14612 | 0.10962 | 0.11636 | 0.08102 | 0.10543 | 0.06727 | 0.0968 | 0.06104 | 0.1291 | 0.1268 | 0.14497 | 84 |
| 0.15295 | 0.1161 | 0.149200 | 0.11538 | 0.1742 | 0.12642 | 0.114836 | 0.069918 | 0.15898 | 0.12229 | 0.12668 | 0.08952 | 0.11657 | 0.07445 | 0.10706 | 0.06764 | 0.14138 | 0.13945 | 0.15608 | 85 |
| 0.16609 | 0.12929 | 0.162800 | 0.12858 | 0.18578 | 0.13979 | 0.124170 | 0.076570 | 0.17221 | 0.13582 | 0.13794 | 0.09858 | 0.12891 | 0.08099 | 0.11842 | 0.07354 | 0.15417 | 0.15261 | 0.16775 | 86 |
| 0.17955 | 0.14332 | 0.176790 | 0.14271 | 0.19706 | 0.15267 | 0.133870 | 0.083870 | 0.18573 | 0.15018 | 0.14984 | 0.10818 | 0.14235 | 0.09079 | 0.13079 | 0.08262 | 0.16749 | 0.16638 | 0.17903 | 87 |
| 0.19327 | 0.15818 | 0.190890 | 0.15761 | 0.20937 | 0.16672 | 0.144073 | 0.091835 | 0.19953 | 0.16538 | 0.16259 | 0.11834 | 0.15673 | 0.10107 | 0.14399 | 0.09211 | 0.18124 | 0.18045 | 0.19174 | 88 |
| 0.20729 | 0.17394 | 0.205290 | 0.17351 | 0.22152 | 0.18107 | 0.154859 | 0.101354 | 0.21369 | 0.18154 | 0.17587 | 0.12904 | 0.17188 | 0.11202 | 0.15786 | 0.10219 | 0.19554 | 0.19503 | 0.20404 | 89 |
| 0.22177 | 0.19075 | 0.220190 | 0.19039 | 0.23369 | 0.19701 | 0.166307 | 0.111750 | 0.22843 | 0.18885 | 0.18957 | 0.1403 | 0.18766 | 0.12192 | 0.17225 | 0.11116 | 0.21053 | 0.21029 | 0.21742 | 90 |
| 0.23598 | 0.20867 | 0.235840 | 0.20858 | 0.24612 | 0.21352 | 0.178214 | 0.123076 | 0.24411 | 0.21768 | 0.20369 | 0.1521 | 0.20404 | 0.12685 | 0.18554 | 0.11505 | 0.22651 | 0.22851 | 0.23158 | 91 |
| 0.25345 | 0.22881 | 0.252750 | 0.2286 | 0.25933 | 0.23254 | 0.190460 | 0.135630 | 0.26143 | 0.23669 | 0.21823 | 0.16446 | 0.21783 | 0.13888 | 0.19931 | 0.12382 | 0.24413 | 0.24413 | 0.24698 | 92 |
| 0.27211 | 0.25151 | 0.271630 | 0.2514 | 0.2763 | 0.25355 | 0.203007 | 0.149577 | 0.28213 | 0.26341 | 0.22319 | 0.17736 | 0.23404 | 0.15164 | 0.21373 | 0.1371 | 0.26404 | 0.26404 | 0.26545 | 93 |
| 0.2959 | 0.27931 | 0.295650 | 0.27931 | 0.29815 | 0.27631 | 0.217904 | 0.165103 | 0.30997 | 0.29523 | 0.24857 | 0.19082 | 0.25114 | 0.17031 | 0.22889 | 0.15408 | 0.28936 | 0.28936 | 0.28936 | 94 |
| 0.32996 | 0.31732 | 0.329960 | 0.31732 | 0.32996 | 0.31732 | 0.234086 | 0.182419 | 0.35196 | 0.34102 | 0.26437 | 0.20482 | 0.26917 | 0.19366 | 0.24481 | 0.17558 | 0.32489 | 0.32489 | 0.32489 | 95 |
| 0.38455 | 0.37574 | 0.384550 | 0.37574 | 0.38455 | 0.37574 | 0.248436 | 0.201757 | 0.42099 | 0.41388 | 0.28059 | 0.21938 | 0.28564 | 0.21566 | 0.25901 | 0.19587 | 0.38097 | 0.38097 | 0.38097 | 96 |
| 0.4802 | 0.47497 | 0.480200 | 0.47497 | 0.4802 | 0.47497 | 0.263954 | 0.222044 | 0.541 | 0.53724 | 0.29723 | 0.23448 | 0.30318 | 0.23848 | 0.27403 | 0.21653 | 0.47769 | 0.47769 | 0.47769 | 97 |
| 0.65798 | 0.65585 | 0.657980 | 0.65585 | 0.65798 | 0.65585 | 0.280803 | 0.243899 | 0.74515 | 0.74396 | 0.31429 | 0.25014 | 0.32188 | 0.24216 | 0.28992 | 0.21832 | 0.65738 | 0.65738 | 0.65738 | 98 |
| 1 | 1 | 1 | 1 | 1 | 1 | | | 1 | 1 | 0.33177 | 0.26634 | 0.34185 | 0.25523 | 0.30674 | 0.22863 | 1 | 1 | 1 | 99 |
| | | | | | | | | | | 0.34967 | 0.2831 | 0.36319 | 0.27573 | 0.32453 | 0.2481 | | | | 100 |
| | | | | | | | | | | | | 0.38008 | 0.29784 | 0.34335 | 0.26969 | | | | 101 |
| | | | | | | | | | | | | 0.39806 | 0.32221 | 0.36327 | 0.29554 | | | | 102 |
| | | | | | | | | | | | | 0.4172 | 0.34906 | 0.38434 | 0.32387 | | | | 103 |
| | | | | | | | | | | | | 0.43756 | 0.37861 | 0.40663 | 0.35491 | | | | 104 |
| | | | | | | | | | | | | 0.45921 | 0.41057 | 0.43021 | 0.36635 | | | | 105 |
| | | | | | | | | | | | | 0.48222 | 0.44333 | 0.45516 | 0.42259 | | | | 106 |
| | | | | | | | | | | | | 0.50669 | 0.47889 | 0.48156 | 0.45763 | | | | 107 |
| | | | | | | | | | | | | 0.53269 | 0.51065 | 0.50949 | 0.49287 | | | | 108 |
| | | | | | | | | | | | | 0.56031 | 0.54581 | 0.53905 | 0.52951 | | | | 109 |
| | | | | | | | | | | | | 0.58964 | 0.58177 | 0.57031 | 0.56895 | | | | 110 |
| | | | | | | | | | | | | 0.62079 | 0.61633 | 0.60339 | 0.603 | | | | 111 |
| | | | | | | | | | | | | 0.65384 | 0.64985 | 0.63636 | 0.638 | | | | 112 |
| | | | | | | | | | | | | 0.68894 | 0.68037 | 0.67541 | 0.67 | | | | 113 |
| | | | | | | | | | | | | 0.72618 | 0.72339 | 0.71458 | 0.7145 | | | | 114 |
| | | | | | | | | | | | | 0.7657 | 0.76341 | 0.75603 | 0.756 | | | | 115 |
| | | | | | | | | | | | | 0.80761 | 0.80493 | 0.79988 | 0.799 | | | | 116 |
| | | | | | | | | | | | | 0.85207 | 0.85044 | 0.84627 | 0.846 | | | | 117 |
| | | | | | | | | | | | | 0.89923 | 0.89244 | 0.89536 | 0.88948 | | | | 118 |
| | | | | | | | | | | | | 0.94922 | 0.93511 | 0.94729 | 0.93363 | | | | 119 |
| | | | | | | | | | | | | 1 | 1 | 1 | 1 | | | | 120 |

SYSTEM AND METHOD FOR INSURING AGAINST TAX LIABILITIES

FIELD OF THE INVENTION

The present invention relates to a system and method that covers the liabilities faced by an individual or entity due to changes in the tax laws or regulations. The present invention also covers an insurance product that enables an individual or entity to handle these liabilities created by changes in laws or regulations.

BACKGROUND OF THE INVENTION

Presently, companies use insurance policies as long term assets to insure against various forms of future liabilities including pre and post retirement employee benefits. There is a problem in that a change in the taxation of some insurance policies will give rise to additional tax expenses that are in fact accruable under current accounting rules for public companies. Additionally, individuals purchase insurance to protect against the financial impact of future uncertain events. Should the insurance proceeds be taxed or treated differently than originally planned, an individual would incur a shortfall relative to his/her original needs.

Until recently one of the primary features of life insurance has been that death benefits under a policy received by an individual policyholder's estate, or by an entity, are tax free. Another tax-advantaged feature of life insurance is that the inside build-up of the life insurance policy is tax-deferred. Thus, the gain on the investment in the life insurance policy, known as the inside build-up, is tax deferred until the investment is paid out, except upon death when it is paid out free from income tax in most situations.

Corporations generally buy life insurance to take advantage of these two tax-saving features. They often use these life insurance policies to fund long term liabilities and expenses. Another example where companies use the tax benefits of life insurance is to fund future pension obligations.

The same benefits for corporations also extend to the individual insurance customer.

Recently, the tax status of death benefits and inside build-up have been the subject of challenge with proposed legislation that's moved through various stages of Congress. A change in the tax laws would dramatically reduce the certainty that companies and individuals have come to rely upon. Therefore, there exists a need for a product as well as a system for managing that product and a method for implementing the product which makes the client agnostic with respect to future tax law changes in regards to death benefits or the inside buildup within the policy or with regard to other tax advantaged aspects of insurance policies of all types.

SUMMARY AND OBJECTS OF THE INVENTION

In order to meet the above-noted needs the present invention relates to a product, and preferably an insurance product, whereby the product benefits reimburse the purchaser for those tax risks associated with existing tax laws, as well as potential changes in the tax laws, including but not limited to the taxation of insurance policies, employees benefits, either qualified or non-qualified, or other taxable items. For purposes of this invention, items can include but not be limited to "items" that are subject to taxation under the Internal Revenue Code of 1986, as amended. An item may be something included in gross income, permitted as a deduction from gross income, items specifically excluded from gross income (such as certain life insurance proceeds under section 101(a)), and items subject to special tax rates.

Another aspect of the present invention is a method to determine a benefit amount and a policy price based upon future potential changes in the tax laws.

The invention is further realized through a computer system which receives as its inputs policy data, owner data and insured data and uses that data to calculate benefits, to price those benefits and to provide as part of its output the price of the policy and a full description of those benefits.

BRIEF DESCRIPTION OF THE FIGURES

FIGS. 3A and 3B are charts providing an illustrative example of the calculations as performed by module 202 of FIG. 2.;

FIGS. 4A & 4B are a chart outlining the pricing calculations performed by module 206 shown in FIG. 2;

FIG. 5 is a chart illustrating the output provided by the output module 208 of FIG. 2; and FIGS. 6A & 6B are a chart illustrating an example of the actuarial assumptions 204 used to determine the pricing benefits 206, as shown in FIG. 2.

DETAILED DESCRIPTION OF THE INVENTION

Figure 1:
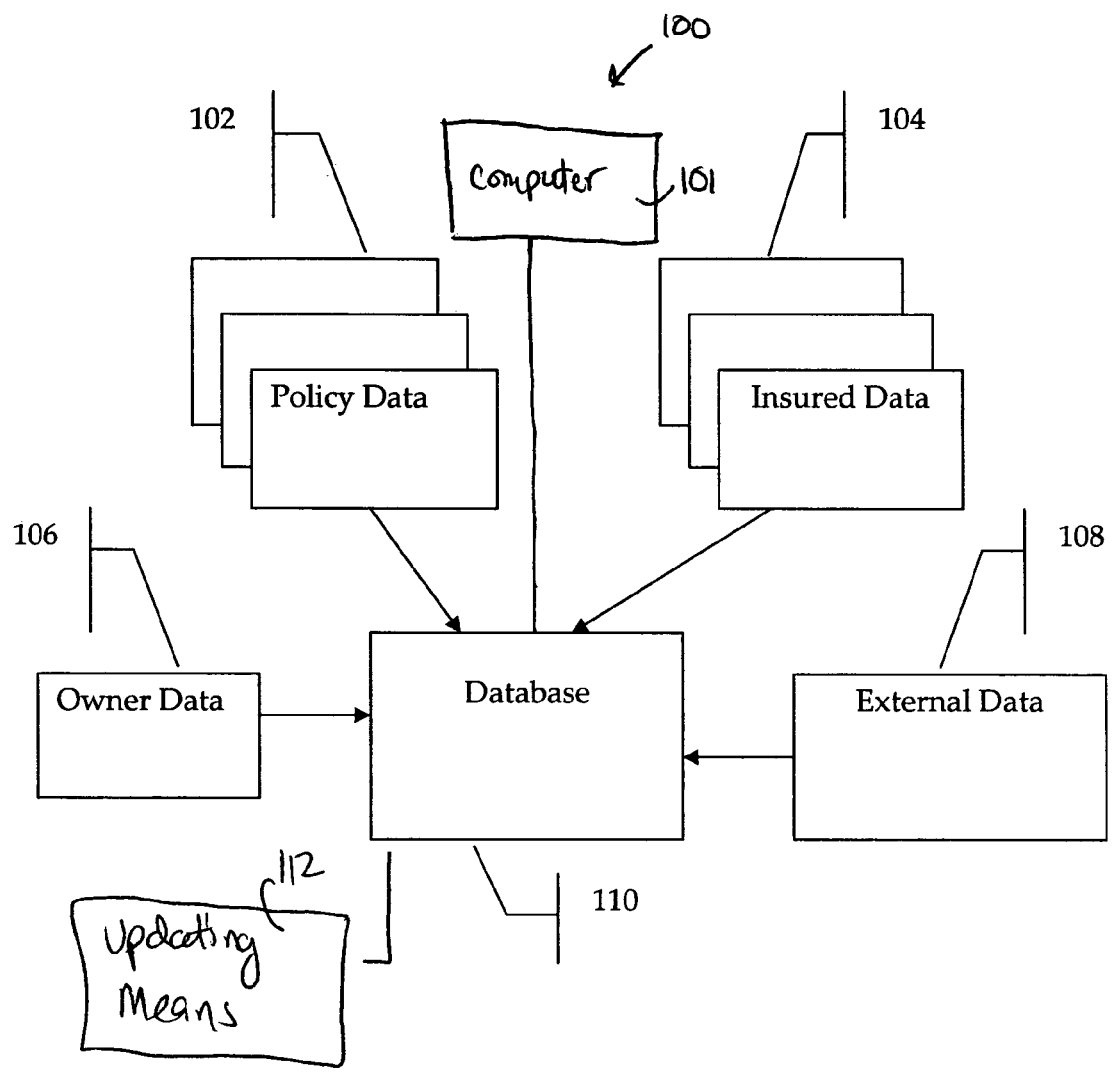
FIG. 1 is a block diagram illustrating the data configuration for the present invention.

The present invention provides a system and method that creates, manages and distributes a benefit on the occurrence of a taxable event such that the amount of the benefit reimburses the purchaser for the economic risks associated with that purchaser's taxes related to the change in taxation of his/her insurance policies.

For purposes of this invention, the term "economic risks" means loss of tax benefits affiliated with a policyholder's insurance policy, and the term "reimbursement" means payment of amounts equal to the tax costs (or approximate costs) that the customer incurs as a result of losing the tax benefit, grossed up to cover any additional taxes due on the amounts received under the invention. It does not include the client's actual total tax liability itself. Also, for purposes of this invention the term "benefit structure" includes but is not limited to the rules for calculating the amount of the benefit by duration based on the potential changes or implication of potential changes of tax law as well as a full description of the nature and qualities of the benefit. Nature can include, for example, the timing of the benefit, and the terms and conditions necessary to receive the benefit, and factors which may limit the benefit, such as a limitation on the maximum marginal tax rates used in determining benefits.

For example, if the tax rate is only 20% on death benefits versus a 40% corporate rate applicable to proceeds under the tax benefit rider, the reimbursement for life insurance proceeds would be based on 20%, but the reimbursement for benefits under the tax benefit rider would be grossed up based upon the 40% tax rate. This reimbursement is defined in the policy itself, and may have limitations based on maximum marginal tax rates for each type of benefit. Beyond the policy limits the benefit can be re-adjusted and dynamic.

Policies will differ on the reimbursement equation, since the reimbursement depends upon not only the taxable amount under whatever insurance policy or other liability is being insured, but also upon the marginal tax rates that are applicable at the time that the tax is incurred.

The process to calculate the benefit amount at each point in time varies. A buyer may purchase the policy as a rider to an existing insurance policy or as a stand-alone policy. To calculate risk in terms of pricing the policy, the method steps and the function s of the present system must occur to make the product profitable.

In a first embodiment the product is a guaranteed insurability rider, where the purchaser has the right to increase the benefits payable under the policy to cover the potential increased taxes associated with a change in the tax law. For example, suppose a change in the tax law resulted in all death benefit proceeds becoming taxable income at a tax rate of 20%. A rider attached to such a $100,000 life insurance policy would grant the owner the right to increase, but not require, the amount of life insurance protection, to $125,000. This would result in the owner being in the same after-tax position at the time of death of the insured, receiving $125,000 from the insurance company, and paying $25,000 in taxes.

In a second embodiment, the above-noted rider applies only to people in a company who are no longer employees and have not been employees for at least one year. The benefit amount under the rider of the second embodiment for the former employees would be equal to the tax incurred if they had terminated employment and had not been employed for at least one year at the time of their death. The benefit amount would be determined at the time of death based on the tax incurred, and possibly grossed-up to cover taxes payable on the increased benefit amount.

In terms of limiting risk, part of the policy risk calculation is to limit the risk associated with extra-statutory reserves of the issuing companies. The policy would allow the insurer to charge for this rider change when there is a risk present. In the case of life insurance the rider change charge would be based upon the maximum statutory valuation rates applicable, which is currently the 1980 CSO (CSO is the Commissioner's Standard Ordinary Mortality Table). The CSO is a table of mortality rates used by the states to set reserves required by life insurance companies issuing life insurance products.

The present invention would also include periodic information updates from the policy-holders regarding their current tax status. The individual's and/or tax rates are critical. In the event, for example, that a policy-holder's income goes up significantly, their risk obviously is impacted more dramatically by a change in the tax law. As a result, there would be an increase in the benefit that the policyholder has under the rider. To accommodate this risk, there may be an increase in the premium, in order to charge the individual cost-of-insurance charges similar to what they pay currently under the risks of the product. The death taxes one policyholder incurs would be twice as high as the taxes another policyholder would incur, because that policyholder is in a higher marginal tax bracket. For the higher income policyholder, therefore, there is a possibility he/she would be paying different rates at that point in time corresponding to the increased benefit amounts. Therefore, the issuer would, in some instances, reserve the right to adjust the premium every year. The premium could also be adjusted based on other factors. For example, performance of the entity that buys the coverage can vary. If the entity is small and never gets to the maximum corporate rate, then the policy assumption may be based upon a 20% tax rate. Alternatively, if the company has lost money for a couple of years, the company may be able to go back and apply the current year's profits against its prior loss position and not pay any tax. In this case, the policy may provide no benefit, or reimburse the excess of taxes actually paid over some period of years against those that would have been paid if the underlying insurance policy's benefits had not been taxable.

In a third embodiment, a corporation may only be interested in protecting the accrued tax liability associated with increases in the inside buildup of life insurance policies, and willing to pay the tax on any amounts received in excess of the cash surrender value. The policy could insure each of these increases with a single premium charge, providing paid-up insurance for the future taxes associated with these increases.

In a fourth embodiment, the policy is structured for a one-time sale and the insurance company reserves can also be structured to handle the losses by charging the right premium one time.

Referring to FIG. 1, the present invention is illustrated as a system which gathers particular data for particular forms.

A shown, the present invention is embodied in a computer system 100 for updating the policy. In the present invention, the policy either can be updated by means of a manual questionnaire mailed to, and filled out by the client, or through the computer system 100 where the policy is updated based upon an online interaction with the policyholder.

The computer system 100 relies on a standard computer 101. The computer 101 can be a computer of any form and capacity, from a microprocessor, to a server, to a large mainframe computer. Moreover, the computer 101 can take the form of a plurality of computers (not shown) which may be physically interconnected and logically coordinated as is well known in the art. The computer 101 also houses the modules shown in FIG. 2. Those modules are designed to calculate among other things the policy price, managing existing policies or collecting information, such as data updates.

At a minimum, the questionnaire (online or otherwise) will need to determine the tax status of each potential policy's benefits. For instance the questionnaire would determine if a person is still an employee and therefore his death would not trigger the tax. That information is stored in the computer system as a part of the insured data 104. The data 102, 104, 106, 108 and the database 110 can form part of a single database, multiple databases, or simply be available as relational or linked information spread across a WAN or LAN and housed in a multiplicity of storage units as is known in the art-all of which comprise the storage means.

Assuming the insured is an employee, and the employment status is relevant to the determination of tax liability of the owner, the insurer needs to know the employment status of the person stored in 104 and if they were terminated, when they terminated employment. A further line of inquiry is whether or not the insured is a key employee or is subject to some other exclusion from tax, or change in applicable tax rates. The results of these questions are also part of the insured data storage 104.

Another way to capture employee information is to get a report from the policy owner as owner data 106. This data can be, for example, information about a corporation, informing the insurance carrier what their current employment status is and when they were terminated. However, the update can also be any other driver of the tax laws and the implementation would be getting enough information into the database 110 in order to verify whether or not a benefit received through this person's death, generates a tax.

Again, although the present invention has only been illustrated regarding a single database and a single computer 100, it is contemplated that any number of databases or computers can be used.

For example, the laws could change so that on all but a company's senior executives, defined as those individuals who fall on the company's 16b list, the individual or company will pay tax on the death benefits.

The present invention is not limited to corporate tax, but also applies if something becomes taxable that was not taxable before; moreover, the present invention applies to tariffs, state taxes as well as all local taxes and other revenue related ordinances.

Figure 2:
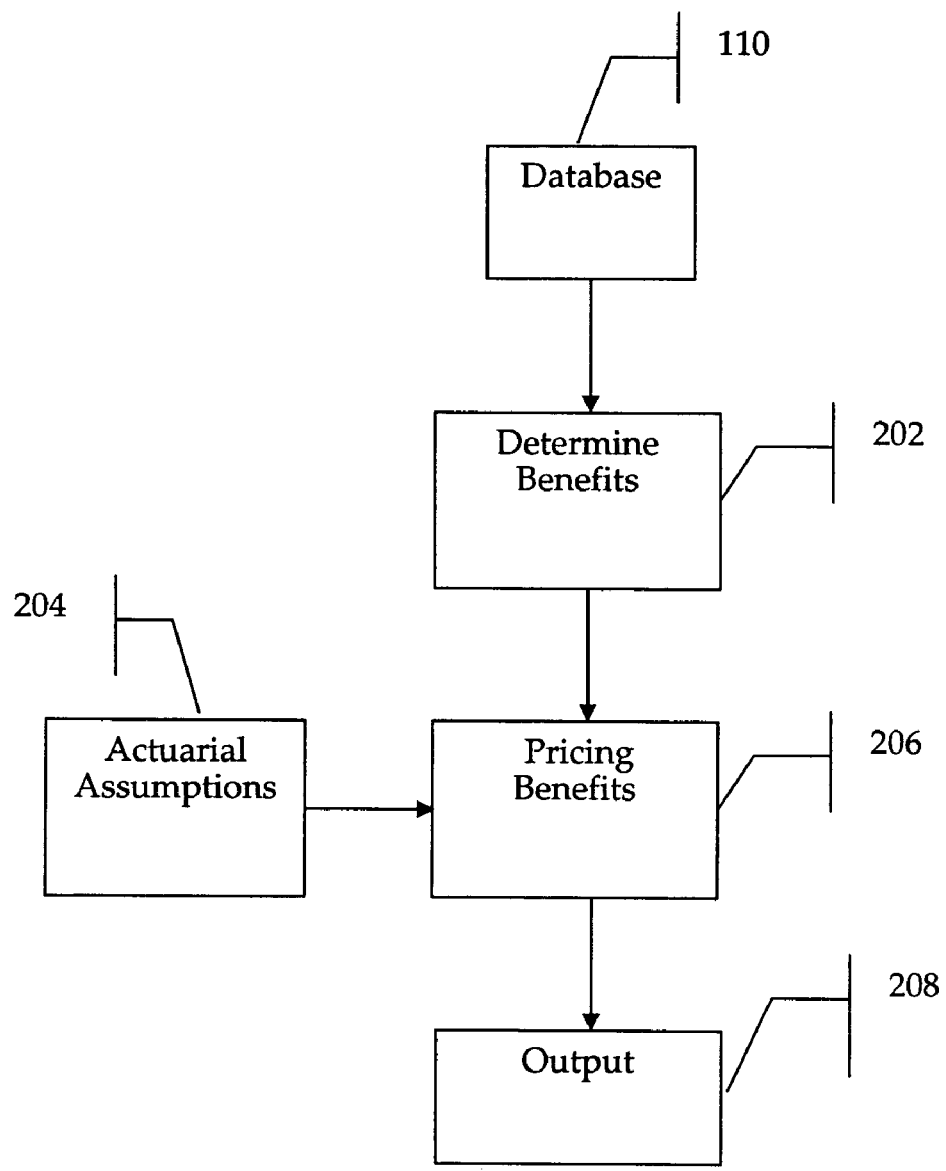
FIG. 2 is a block diagram of the modules that provide the calculation function for the present system.

Once the employment status, or the status of any other relevant factor is determined and stored in the database 110, then the insurer can calculate through the computer 101 what the appropriate benefit would be according to calculation modules described below and as shown in FIG. 2.

Upon completion of the benefit calculation, then the company or other policy owner uses an updating means 112, for updating the policy on a periodic basis, (annual or otherwise). The updating means can take the form of a computer, which is either part of or separate from computer 101. Alternatively, the present invention contemplates that there is no adjusting at all, and the premium is determined up front.

In sum therefore, the product can be a single premium product as well as a single charge or an ongoing charge product. In addition, the charge rate basis can vary, based on any number of factors.

The tax recovery benefit can also be defined in a number of different ways. First it can reimburse the tax, including any tax on the benefit provided, in a lump sum. If the tax due is over a period of time, the benefit may be provided in periodic payments, or in a lump sum using interest discount rates.

Second, it can reimburse any tax expense, over a specified amount, or an amount specified by formula. For example, the policy can reimburse the tax expense in excess of the tax that would have been payable if the tax rules in effect on the date of purchase of the policy had not changed. In a second example, the same basic principle as the first example is employed, except the tax benefit is capped at a flat dollar amount, or capped using a specified maximum marginal tax rate. Alternatively, the tax benefit is capped at a flat dollar amount, or capped using a specified maximum marginal tax rate.

In addition to the four previously described product embodiments, several alternative designs for the tax recovery product exist.

In a fifth embodiment the tax recovery product is incorporated into a life insurance policy, providing that the benefit, with limitations, is provided automatically. For example, if the beneficiary of death benefit proceeds is subject to a 10% tax on a $90,000 policy, the amount paid out would be $100,000 to provide the tax due on the policy proceeds.

In a sixth embodiment, the tax recovery feature is incorporated into a life insurance policy as an optional increased death benefit, providing the owner the right to accept or reject the increase as the owner sees fit. This would be applicable where the costs of the product would change, or there is the possibility of another adverse consequence to the policyholder or beneficiary if the benefit amount paid changed.

In a seventh alternative embodiment, the feature is incorporated into a life insurance policy as an optional increased death benefit, providing the owner the right to accept a percentage of the tax recovery benefit as the owner sees fit. In this example, the owner selects an amount designed to recover taxes, but the actual payout may be based on tax rates at the time the benefit is elected, rather that when it is paid. Thus, the benefit amount may be independent of future tax law changes. Using the example in the sixth embodiment above, the death benefit would be increased to $100,000 from $90,000 based upon today's 10% tax rate. If the tax rate applicable at time of death were 20%, then the amount paid would still be $100,000, and not $112,500, the amount needed to cover the 20% tax and still have $90,000 left over.

In an eighth embodiment, a separate contract is issued insuring the tax risk on an existing policy or set of policies. In the case of a $100,000 policy subject to 20% tax rate, the policy benefit would be $20,000.

In a ninth embodiment, a separate contract is issued insuring the tax risk on an existing policy or set of policies, and providing incremental benefits to cover the tax on the benefits provided under the separate contract. Continuing the previous example, if a 50% contract applied to benefits under the separate contract, the total benefit amount would be double the previous benefit amount, or $40,000. The extra $20,000 is needed to cover the taxes incurred as a result of receiving these benefits. The contract may be a group policy insuring some of the same lives, a subset of the lives insured under the policies to be protected by the tax recovery product, or an entirely new set of lives. As previously noted, premium rates may be fixed or variable.

To determine the benefit amount, the system and method of the present invention rely on the following data input and calculations, as will be described in more detail regarding FIGS. 2-6.

First the taxable amount of any benefit receivable under the product covered by the tax recovery product must be determined. This is calculated as the difference in taxes payable under two scenarios. If the product covers the tax risk associated with taxes payable upon death, the first scenario assumes the insured does not die, and the second calculation assumes the insured dies. The benefit is the amount payable that causes the difference in taxes to equal the benefit. A second critical piece of information relates to the tax status of the policyholder, including marginal taxable income rates applicable to both the product covered by the tax recovery product as well as to any benefits provided by the tax recovery product. To determine the taxable amount of the benefit above, the status of the taxpayer must be ascertained as well as, the insured, the relationship as of inception of the underlying policy, the relationship as of the date the tax recovery product is purchased (if different), and the current relationship of the insured to the taxpayer. Also, the gross benefit payable under the insurance policy if the insured event occurs and also the tax basis of the policyholder in the underlying insurance product is determined;

FIGS. 2-6, which are explained below, describe how the above factors are used to calculate the benefit, and ultimately the policy price.

If the product insures only the increase in tax expense associated with changes in the tax law, then the taxable amount of the benefit at time of purchase would need to be known and tracked.

Referring now to FIG. 1 in more detail, policy data 102 refers to information about the insurance policies or items covered, and may come from many insurance companies. The typical information includes the issue date of the policy, historical and current benefit levels, cash values, and tax bases, as well as projections of these amounts, whether or not the policy is a Modified Endowment Contract, which is a subclassification of life insurance policies created by 7702A of the Internal Revenue Code.

Insured data 104 refers to information about the insureds relevant to the protection desired. For example, if the insureds are employees, the insureds' employment histories, including employee status at times the contracts were purchased, current employment status (employed, retired, board member, etc. . . .), and possibly hours worked may be relevant. If the insureds are members of the board of directors, different information may be required.

Owner data 106 refers to information about the policy owner, including the type of taxable entity, and applicable taxable income (current and projected). This may include particular information around the accounting presentation issues, such as derivative protection, and the ability to present the value of the policy as an offset to any taxable income reported on the accounting basis as a result of a tax law change. The specific type of tax protection desired, included caps on cost or on tax rate assumptions would be provided.

External data 108 refers to information to determine benefit amounts under the contract. This includes information about the tax rules, both at inception of the underlying life policies, currently, and possible future changes, as well as the applicable generally accepted accounting principles and interpretations.

The above information is used to populate a database or other storage means, such as multiple databases, a relational database, or information linked over a LAN or WAN 110. As previously noted, the database or storage means is the consolidated source of information for the processing module, which determines benefits and prices.

Referring now to FIG. 2, in module 202 the database information is used to determine the form and nature of the benefit based upon the input objectives of the owner, the tax rules at the time, the type of protection desired, and the applicability of the tax rules based on the relationship of the insureds to the policy owner. For example, the benefit may need to be fully paid-up, as a single premium. Further details regarding the form of the benefit are illustrated in FIG. 3, as described below.

As shown in FIG. 3, module 202 calculates the benefit amount that will be paid upon the event of a loss due to a tax law change. Data is pulled from the Database 110 which was populated by data from 102 (Policy Data), 104 (Insured Data), 106 (Owner Data) and 108 (External Data).

The calculations performed by module 202 are as follows: Step 1 (one) involves the calculation of the amount of tax that will be due by the owner as a result of a tax law change. The calculation will vary by type of tax law change covered as well as the underlying product affected. In one example, a life insurance policy has become subject to a 15% income tax on the death proceeds paid in excess of the premiums paid into the policy. In another example 4, the excess of death benefits over the tax basis is $700. Originally under previous tax law the $700 would have been received tax free by the owner. The new (assumed) tax law imposes a 15% tax on the $700 gain resulting in a $105.00 unexpected tax.

The module 202 in step 2 (FIG. 3) then calculates the benefit required to offset this new tax liability. It is assumed that the benefit will be taxable and that the premiums paid for the benefit were not deductible (both assumptions are subject to tax law interpretations). In the example, the premium is assumed to be $15. The initial taxable gain from a benefit of 105 would be $90. The $90 then needs to be grossed up for taxes to arrive at a total pre-tax benefit paid to the owner of $165.

The third and final calculation step of the benefit calculation system is to perform a quality check and reverse calculation to confirm the proper amount was determined. The $165 benefit would create a $150 taxable gain (165-15 premium) to the owner. Applying the appropriate tax rates would result in an after-tax benefit of $105 matching the amount needed to pay the new taxes as a result of a tax law change.

Referring back to FIG. 2, actuarial assumptions (204) are input to the Pricing Benefits (206) module. FIG. 6 is a chart illustrating an example of the actuarial assumptions used in the present invention. Key assumptions here include mortality and morbidity assumptions, lapse rate assumptions, investment return assumptions, and expense rates assumptions. These assumptions are used to project the benefit levels for the current purchase, the expected cost of providing these, benefits, and margins reflecting variability in expected costs as well as carrier profits.

The pricing of the benefits (206) is an iterative process. An initial price is set based on the desired benefit structure, and if all goals are met, this benefit structure is used. If not, then the benefits are reduced or limited to achieve the price objective set by the owner. Further details regarding the module 206 are set forth in FIG. 4

Referring now to FIG. 4, the Pricing Benefits Module 206 is the system engine module that calculates the premium/price for the product. FIG. 4 is a chart which illustrates the pricing calculations as performed on an example policy.

Specifically, module 206 utilizes data from Database 110 as well as data from the Actuarial Assumptions module 204. The actual pricing will follow generally accepted actuarial principles and procedures. The following is one example, as shown in FIG. 4 of a possible embodiment involving a life insurance policy being insured against a tax law change that would tax the inside build up of cash values and death benefits.

Step one involves the initial calculations involve the projection of a demographic group covered by the product. The demographic group is obtained from the Database 110. The current demographic group is projected into the future using Actuarial Assumptions 204 for mortality and lapses (other decrements are possible as well). Policy information from database 110 is also utilized to project the underlying product.

Internal pricing assumptions from 204 are then utilized in step 2 to calculate expenses, profits, risk factors and required returns. The potential liability from step 1 is combined with the actuarial pricing requirements to determine the price/premium for the product. Standard actuarial pricing methods are then used to complete and recertify the pricing results The final output (208) is the full benefit description and the price. The output can provided to the recipient by any conventionally known means, including print, electronically, by means of audio delivery, or any other suitable communications. The outputted data is all information needed to populate the insurance policy's specification page, identifying benefits, limitations, and price. The data is also all information necessary in order to complete a derivatives contract, for example, in accordance with ISDA standards, as is well known in the art. Further details regarding output 208 are described in FIG. 5 below.

Referring to FIG. 5, the module 208 receives information from modules 110, 206 and 202 to create a report for the owner. The report as shown in FIG. 5, illustrates the effect of the tax recovery product on the underlying tax affected product, in this example a life insurance policy. The example illustrates one possible form of output relative to a tax law change affecting a life insurance policy. The Life Insurance Illustrative Values section calculates and projects future values of the underlying insurance policy as well as calculates various potential tax impacts due to a tax law change. The projection of life insurance values is prior art.

The TRP Illustrative Values section demonstrates the impact of the tax recovery product based on the benefit calculation 202 and the pricing calculation 206. Current accounting and tax treatment is pulled from Database 110 and applied to complete the schedule.

The final section illustrates the combined income statement due to the interrelated workings of the base policy and the tax recovery product.

Additional formats and information will be output depending on the embodiment of the underlying tax affected program and the tax recovery benefit program selected by the owner.

While the invention has been described and illustrated in connection with the preferred embodiments, many variations and/or modifications as will be evident to those skilled in the art may be made without departing from the scope and spirit of this invention, and the invention is thus not to be limited to the precise details of the methodology or constructions or products set forth above as such variations and modifications are intended to be included within the scope of the invention.

What is claimed is:

1. A computerized method for determining insurance benefit amounts based upon tax rules, and potential changes in the tax rules, comprising the steps of:

obtaining and storing data regarding an insured on a computer-readable storage medium;

obtaining and storing data on items covered on the computer-readable storage medium;

obtaining and storing data regarding a policy owner on the computer-readable storage medium; and using a processor apparatus comprising at least one computer processor to determine a form and nature of an insurance benefit based upon input objectives of the policy owner, the tax rules at the time, potential changes in the tax rules, type of protection desired, and applicability of the tax rules based on a relationship of the insured to the policy owner, wherein the amount of the insurance benefit reimburses the policy owner for economic risks associated with that policy owner's taxes related to the potential changes in the tax rules;

inputting and storing on the computer-readable storage medium actuarial assumptions to a pricing benefits module wherein assumptions include mortality and morbidity assumptions, lapse rate assumptions, investment return assumptions, and expense rates assumptions;

using the processor to calculate an insurance product price based upon the determined form and nature of the insurance benefit and the actuarial assumptions;

using the processor to project insurance benefit levels for a current purchase, an expected cost of providing benefits, margins reflecting variability in expected costs, and policy carrier profits, wherein the step of using the processor to project insurance benefit levels is performed iteratively, wherein an initial price is set based on a desired insurance benefit structure, and if all goals are met, this insurance benefit structure is used and if all goals are not met, then the insurance benefits are reduced or limited to achieve a price objective set by the policy owner; and using an output unit to output a full insurance benefit description and price in order that all outputted information is provided to populate an insurance policy's specification page, identifying insurance benefits, limitations, and price.

2. A computer system for determining an insurance benefit structure, comprising:

a computer-readable storage medium configured to store owner data, insured data, actuarial data, policy data, tax related data, current tax rules, and potential changes in tax rules;

a processor apparatus comprising at least one computer processor, the computer process configured to:

determine a form and nature of an insurance benefit based upon input objectives of the policy owner, the tax rules at the time, potential changes in the tax rules, type of protection desired, and applicability of the tax rules based on a relationship of the insured to the policy owner, wherein the amount of the insurance benefit reimburses the policy owner for economic risks associated with that policy owner's taxes related to the potential changes in the tax rules;

calculate an insurance product price based upon the determined form and nature of the insurance benefit and the actuarial assumptions; and project insurance benefit levels for a current purchase, an expected cost of providing benefits, margins reflecting variability in expected costs, and policy carrier profits, wherein the step of using the processor to project insurance benefit levels is performed iteratively, wherein an initial price is set based on a desired insurance benefit structure, and if all goals are met, this insurance benefit structure is used and if all goals are not met, then the insurance benefits are reduced or limited to achieve a price objective set by the policy owner; and an output unit configured to provide the insurance benefit structure.

3. A computerized method for determining an insurance product price and benefit structure based upon tax rules, and potential changes in tax rules, comprising the steps of:

obtaining and storing data regarding an insured on a computer-readable storage medium;

obtaining and storing data regarding a product owner on the computer-readable storage medium;

obtaining and storing data on items covered on the computer-readable storage medium;

using a processor apparatus comprising at least one computer processor to determine a nature of the insurance benefit based upon inputted objectives of the product owner, the tax rules at the time, potential changes in the tax rules, type of protection desired, and applicability of the tax rules based on a relationship of the insured to the product owner, wherein the amount of the insurance benefit reimburses the produce owner for economic risks associated with that product owner's taxes related to the potential changes in the tax rules;

inputting and storing on the computer-readable storage medium actuarial assumptions to a pricing benefits module wherein assumptions include mortality and morbidity assumptions, lapse rate assumptions, investment return assumptions, and expense rates assumptions;

using the processor to calculate an insurance product price based upon the determined insurance benefit nature and the actuarial assumptions; and using the processor to project insurance benefit levels for a current purchase, an expected cost of providing benefits, margins reflecting variability in expected costs, and policy carrier profits, wherein the step of using the processor to project insurance benefit levels is performed iteratively, wherein an initial price is set based on a desired insurance benefit structure, and if all goals are met, this insurance benefit structure is used and if all goals are not met, then the insurance benefits are reduced or limited to achieve a price objective set by the policy owner; and using an output unit to output a full insurance benefit description and price in order that all outputted information is provided to populate a product's specification page, identifying benefits, limitations, and price.

4. A computer system for determining an insurance product price, comprising:
- a computer-readable storage medium configured to store owner data, insured data, actuarial data, policy data, tax related data, current tax rules, and potential changes in tax rules;
- a processor apparatus comprising at least one computer processor, the computer process configured to:
  - determine a form and nature of an insurance benefit based upon input objectives of the policy owner, the tax rules at the time, potential changes in the tax rules, type of protection desired, and applicability of the tax rules based on a relationship of the insured to the policy owner, wherein the amount of the insurance benefit reimburses the policy owner for economic risks associated with that policy owner's taxes related to the potential changes in the tax rules;
  - calculate an insurance product price based upon the determined form and nature of the insurance benefit and the actuarial assumptions; and
  - project insurance benefit levels for a current purchase, an expected cost of providing benefits, margins reflecting variability in expected costs, and policy carrier profits, wherein the step of using the processor to project insurance benefit levels is performed iteratively, wherein an initial price is set based on a desired insurance benefit structure, and if all goals are met, this insurance benefit structure is used and if all goals are not met, then the insurance benefits are reduced or limited to achieve a price objective set by the policy owner; and
- an output unit configured to provide the product price.

* * * * *